March 11, 1924.
P. W. GATES
VIBRATOR
Filed Jan. 4, 1919
1,486,486
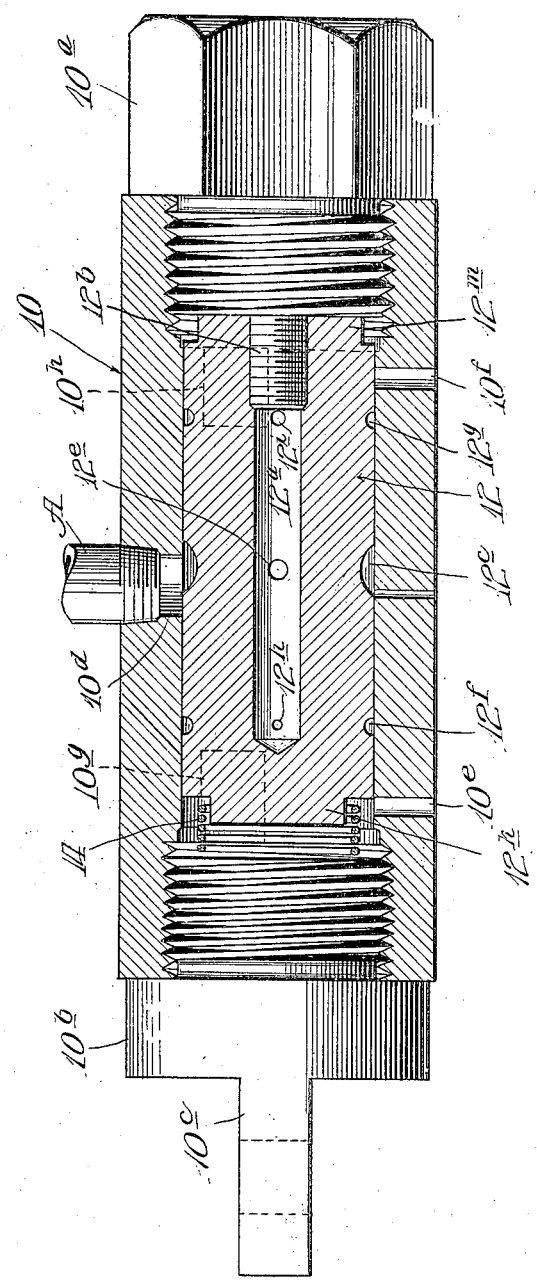
INVENTOR
Philetus W. Gates
BY
Sheridan, Jones, Sheridan & Smith
ATTORNEYS
Witness:
Harry S. Gaither Patented Mar. 11, 1924.

1,486,486

UNITED STATES PATENT OFFICE.

PHILETUS W. GATES, OF CHICAGO, ILLINOIS, ASSIGNOR TO MUMFORD MOLDING MACHINE COMPANY, A CORPORATION OF NEW JERSEY.

VIBRATOR.

Application filed January 4, 1919. Serial No. 269,582.

*To all whom it may concern:*

Be it known that I, PHILETUS W. GATES, a citizen of the United States, residing at Chicago, in the county of Cook and State of Illinois, have invented certain new and useful Improvements in Vibrators, of which the following is a specification.

This invention relates to improvements in vibrators, and has for its object to provide a vibrator especially adapted for use with molding machines or in molding operations. Its principal object is to provide a vibrator in which the action is unbalanced, that is, the impact of one stroke of the vibrator piston is less than the impact of the other. These and other objects will be more fully set forth in the following specification and shown in the accompanying drawing in which—

10 designates a cylinder internally threaded at each end. To these threaded ends are screwed the plug $10^a$ and cap $10^b$, the latter being provided with a flange $10^c$ for attachment to the mechanism to be vibrated. The cylinder is provided with a relatively large inlet duct $10^d$, in which is threaded a supply pipe A for operating fluid. The cylinder is also provided with exhaust ports $10^e$ and $10^f$, and with internal recesses $10^g$ and $10^h$ adjacent the respective ends of the cylinder, as shown in the drawing.

Reciprocably mounted and closely fitting in the cylinder is the piston 12 provided with a central duct $12^a$, enlarged to constitute in effect a reservoir. This duct is closed at its open end by means of the screw plug $12^b$. A central peripheral groove $12^c$ is provided on the piston 12, this groove being so located as to be in constant communication with the inlet duct $10^d$ of the cylinder. A cross communicating duct $12^e$ extends from the central duct $12^a$ to the groove $12^c$. Peripheral grooves $12^f$ and $12^g$ are provided on the piston 12 adjacent the ends thereof, and cross ducts $12^h$ and $12^i$ lead from the central duct to the grooves $12^f$ and $12^g$, respectively. The duct $12^h$ is relatively considerably smaller than the duct $12^i$, for a purpose to be hereinafter described. The piston is further provided with the impact bosses $12^k$ and $12^m$, the former being smaller, and a spring 14 extends around the boss $12^k$ and between the corresponding end of cylinder 12 and cap $10^b$.

In the operation of the vibrator air, being supplied through pipe A and duct $10^d$ to the interior of the cylinder, flows around the piston groove $12^c$, and from thence through the cross duct $12^e$ to the central or interiorly located duct $12^a$, from whence, when the piston is in the position shown, it flows via the duct $12^i$ to the groove $12^g$, this duct being in communication with the recess $10^h$. The operating fluid flows into the right hand end of the cylinder and operates to force the piston rapidly in the opposite direction against the action of the spring 14 until the boss $12^k$ impacts against the end of the cap. Prior to such impact the groove $12^g$ moves out of communication with the recess, cutting off the supply of air to that end of the cylinder. Admission of actuating fluid to the other end of the cylinder, however, begins through communication of groove $12^f$ with recess $10^g$, fluid being conveyed to said groove through the relatively small cross duct $12^h$. Prior to the beginning of the return movement exhaust of air through the port $10^t$ takes place. The return stroke takes place as the result of the admission of air to this end of the cylinder, and is enhanced by the action of the spring 14. This spring is of sufficient strength to maintain the piston 12 normally in the position shown in the drawing, so as to be ready for an impact stroke upon admitting the supply of operating fluid and to prevent the piston stalling or lying in dead center.

My invention consists in the provision of the relatively small cross duct $12^h$, which functions to supply less air for the movement of the piston from left to right, as viewed in the drawing, whereby the impact of the piston against the right hand plug $10^a$ is considerably less than the impact against the left hand cap $10^b$. The object of this operation is to unbalance the vibrator, since the piston in this vibrator, travelling at a speed of several thousand vibrations per minute, tends to counterbalance or neutralize the impacts when of equal force. This is also assisted by the time required to overcome the inertia of the mechanism to which it is attached. By my construction one of the two impacts of each cycle is considerably greater than the other, so that there is an unbalanced vibration, as it is termed. The other novel features of the vibrator are set forth and covered in the co-pending application of William P. Krause, filed of even date herewith, Serial No. 269,579.

I do not wish to be restricted to the form of my invention shown in the accompanying drawings and described in the foregoing specification, except as defined in the appended claims.

What I claim is:

1. A vibrator comprising a cylinder closed at the ends, a piston reciprocably mounted therein to impact at the ends of said cylinder, said piston being provided with an interiorly located duct, said cylinder being provided with a fluid supply inlet, means to maintain constant communication between said inlet and said duct, and ducts leading from said first-named duct to the respective ends of said cylinder, one of said second-named ducts being relatively larger than the other.

2. A vibrator comprising a cylinder closed at the ends and having a fluid supply inlet, a piston reciprocable therein to impact at each end of said cylinder, said piston being provided with an interiorly located duct in constant communication with said inlet, and a duct at each end of said first-named duct communicating with the respective end of said cylinder, one of said ducts being relatively larger than the other.

In testimony whereof, I have subscribed my name.

PHILETUS W. GATES.